(12) United States Patent
Chou

(10) Patent No.: US 7,396,166 B1
(45) Date of Patent: Jul. 8, 2008

(54) OPTICAL TRANSCEIVER MODULE

(75) Inventor: Huitsuo Chou, Hsin-Chu (TW)

(73) Assignee: OptoMedia Technology Inc., Hsin-Chu (TW)

( * ) Notice: Subject to any disclaimer, the term of this patent is extended or adjusted under 35 U.S.C. 154(b) by 0 days.

(21) Appl. No.: 11/714,858

(22) Filed: Mar. 7, 2007

(51) Int. Cl.
*G02B 6/36* (2006.01)
*H04B 10/00* (2006.01)

(52) U.S. Cl. .............. 385/92; 385/14; 385/88; 385/89; 398/135; 398/138; 398/139

(58) Field of Classification Search ............ 385/14, 385/53, 88, 89, 92, 93, 94, 139, 14.53; 398/135, 398/138, 139
See application file for complete search history.

(56) References Cited

U.S. PATENT DOCUMENTS

| | | | |
|---|---|---|---|
| 6,213,651 B1 * | 4/2001 | Jiang et al. .................... 385/92 |
| 6,840,686 B2 * | 1/2005 | Jiang et al. .................... 385/92 |
| 6,952,532 B2 * | 10/2005 | Dair et al. .................... 398/139 |
| 7,090,509 B1 * | 8/2006 | Gilliland et al. ............ 439/76.1 |

* cited by examiner

*Primary Examiner*—Brian M. Healy
(74) *Attorney, Agent, or Firm*—Muncy, Geissler, Olds & Lowe, PLLC

(57) ABSTRACT

An optical transceiver module including a housing and a plurality of optical transceiver devices is provided. The housing has a connector portion disposed at an end thereof. The connector portion includes two receptacles formed thereon. The optical transceiver devices are disposed in the housing, corresponding to the receptacles. Each one of the optical transceiver devices includes a printed circuit board, an optoelectronic component and a connecting interface. The printed circuit board is disposed substantially perpendicular to a bottom surface of the housing. The optoelectronic component has an optical fiber interface, a reception portion and a transmission portion. The orientation of the optical fiber interface, the orientation of the reception portion and the orientation of the transmission portion are parallel to the printed circuit board.

18 Claims, 2 Drawing Sheets

OPTICAL TRANSCEIVER MODULE

BACKGROUND

1. Field of Invention

The present invention relates to a transceiver module, and more particularly, to an optical transceiver module.

2. Description of Related Art

As network technology grows rapidly, optoelectronic communication technology is becoming more popular because optoelectronic communication transfers a large amount of data at a high speed. One of the critical components in optoelectronic communication is the optical transceiver module, which includes a receiver to transform a received optical signal into an electronic signal, and a transmitter to transform an electronic signal into an optical signal and to transmit the optical signal.

Networking equipment such as a hub is typically equipped with optical transceiver modules as described above. Fibre channel cables can be plugged into networking equipment through the optical transceiver modules. In recent fibre channel products, Gigabit Interface Converter (GBIC) optical transceiver modules have been replaced by Small Form Factor (SFF) optical transceiver modules. The SFF optical transceiver module has a more compact volume than that of the GBIC optical transceiver module. Thus, designers can put more optical transceiver modules in the same area of the networking equipment by using the SFF optical transceiver module.

An SFF optical transceiver module may not be compatible with the layout of the networking equipment. Moreover, GBIC provide an SC-type connector while SFF provide an LC-type connector. Hence, designers may have to modify the layout of the networking equipment greatly so as to replace GBIC optical transceiver modules with SFF optical transceiver modules. This may increase the total system cost of the networking equipment.

SUMMARY

The present invention provides a optical transceiver device including a printed circuit board, an optoelectronic component and a connecting interface. The optoelectronic component has an optical fiber interface, a reception portion and a transmission portion. The reception portion and the transmission portion are connected to the printed circuit board. The orientation of the optical fiber interface, the orientation of the reception portion and the orientation of the transmission portion are parallel to the printed circuit board.

According to an embodiment of the present invention, the optical transceiver device width can be narrowed. Thus, more optical transceiver devices can be disposed in the same area of networking equipment.

The present invention also provides an optical transceiver module including a housing and a plurality of optical transceiver devices. The housing has a connector portion disposed at an end thereof. The connector portion includes two receptacles formed thereon. The optical transceiver devices are disposed in the housing, corresponding to the receptacles. Each one of the optical transceiver devices includes a printed circuit board, an optoelectronic component and a connecting interface. The printed circuit board is disposed substantially perpendicular to a bottom surface of the housing.

According to an embodiment of the present invention, the transceiver module with substantially the same size as a GBIC optical transceiver module can hold two SFF single channel bi-direction optical transceiver modules. Thus, designers can put more than twice as many modules in the same area of networking equipment. Moreover, designers can replace conventional GBIC optical transceiver modules in networking equipment with the transceiver modules of the present invention without having to greatly modify the layout of the networking equipment.

According to an embodiment of the present invention, the connecting interface has a plurality of pins arranged in one row and parallel to the printed circuit board. The optical transceiver device width can be narrowed. Moreover, users can easily align the connecting interface with a socket, thus simplifying the process of connecting the optical transceiver device with the socket.

It is to be understood that both the foregoing general description and the following detailed description are by examples and are intended to provide further explanations of the invention as claimed.

BRIEF DESCRIPTION OF THE DRAWINGS

These and other features, aspects and advantages of the invention will become apparent by reference to the following description and accompanying drawings, which are given by way of illustration only, and thus are not limitative of the invention, wherein.

DESCRIPTION OF THE PREFERRED EMBODIMENTS

Figure 1:
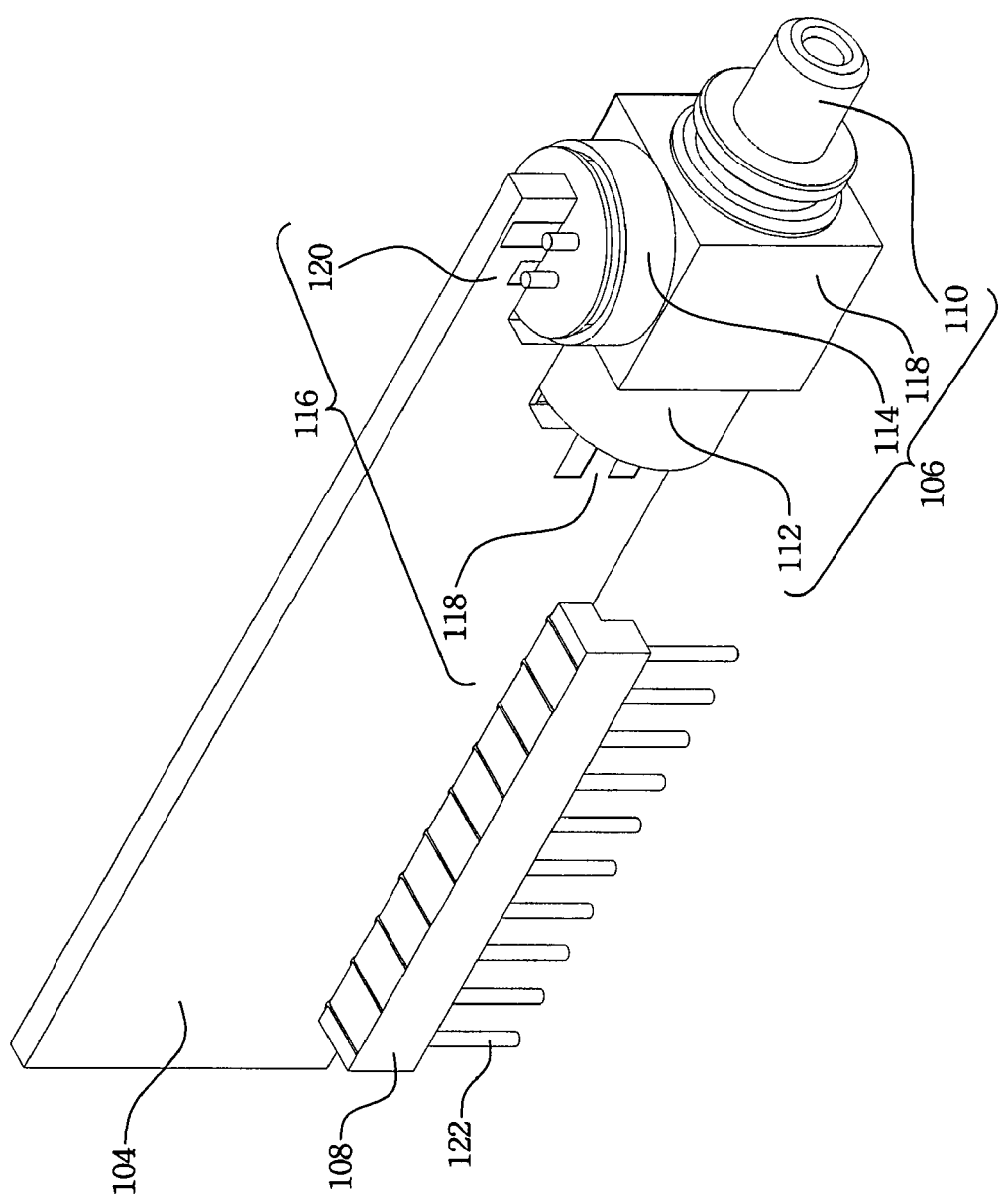
FIG. 1 illustrates a optical transceiver device according to an embodiment of the present invention.

FIG. 1 illustrates a optical transceiver device according to an embodiment of the present invention. The optical transceiver device 102 includes a printed circuit board 104, an optoelectronic component 106 and a connecting interface 108. The printed circuit board 104 has reception circuits and transmission circuits built thereon. The optoelectronic component 106 has an intermediate block 118, an optical fiber interface 110, a reception portion 112 and a transmission portion 114. The optical fiber interface 110, the reception portion 112 and the transmission portion 114 are connected to the intermediate block 118. The optical fiber interface 110 can be connected to a fiber optic line to receive and transmit optical signals. The reception portion 112 and the transmission portion 114 are connected to the printed circuit board 104 to receive/transmit the electrical signals from/to the printed circuit board 104. It is worth noting that the orientation of the optical fiber interface 110, the orientation of the reception portion 112 and the orientation of the transmission portion 114 are parallel to the printed circuit board 104 so that the optical transceiver device width can be narrowed.

In addition, the intermediate block 118 is preferably a cubical block and the height of the circuit board 104 is higher than the height of the intermediate block 118. Accordingly, more optical transceiver devices can be disposed in the same area of the networking equipment.

In accordance with an embodiment of the present invention disclosed herein, the optical transceiver device 102 may be a SFF single channel bi-direction optical transceiver device.

The printed circuit board 104 has an L-shaped structure 116 with a first segment 118 and a second segment 120. The reception portion 112 and the transmission portion 114 are connected to the first segment 118 and the second segment 120 respectively. The connecting interface 108 is mounted on the printed circuit board 104. The connecting interface 108 has a plurality of pins 122, including reception pins and transmission pins, arranged in only one row. Users can easily align the connecting interface 108 with a socket in networking equipment, thus simplifying the process of connecting the optical transceiver device 102 with the socket. It is worth noting that the pins 122 can be arranged parallel to the printed circuit board 104, thus narrowing the width of the optical transceiver device 102. The pins 122 are preferably L-shaped pins and penetrated through the circuit board 104.

Figure 2:
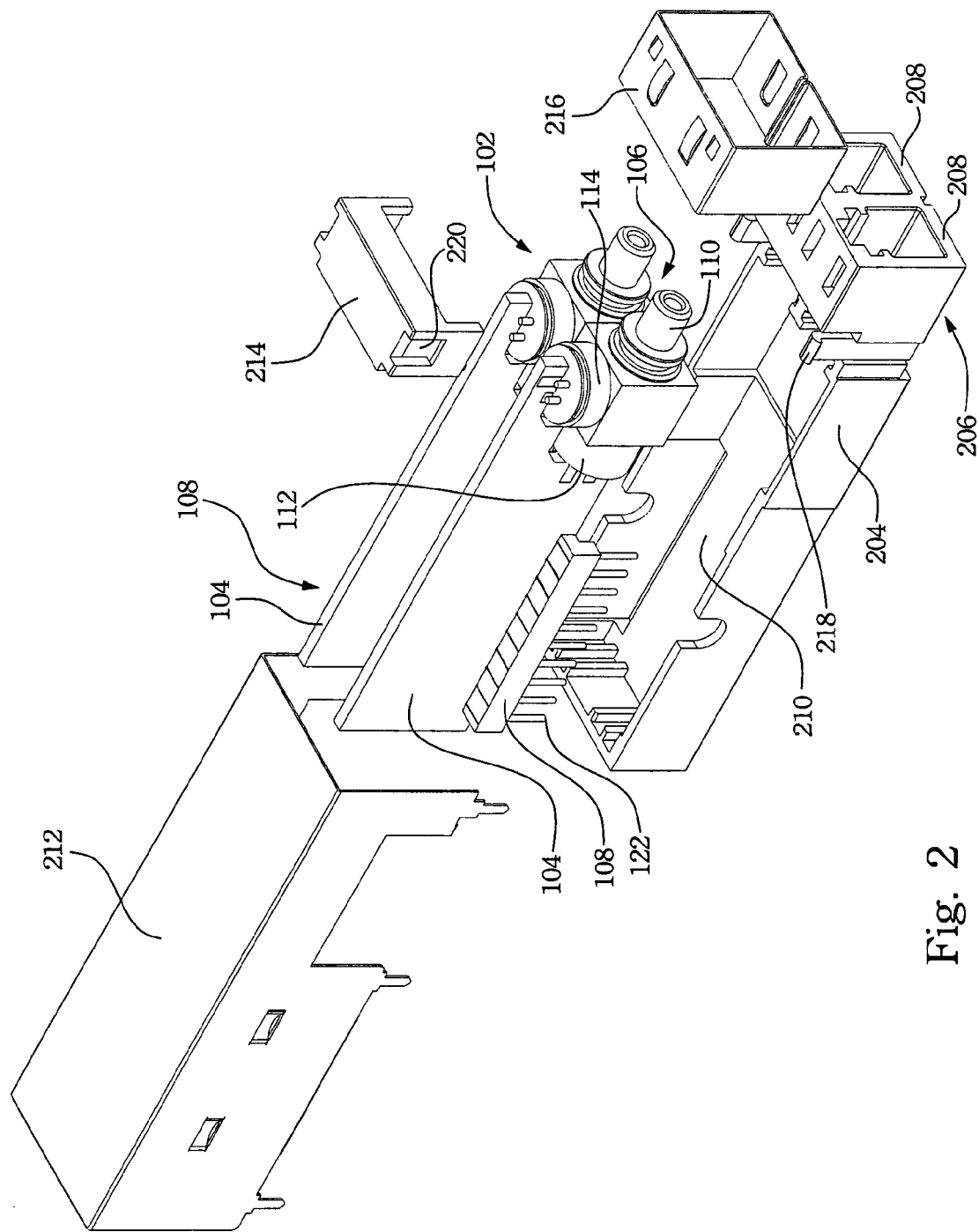
FIG. 2 illustrates an optical transceiver module according to an embodiment of the present invention.

FIG. 2 illustrates an optical transceiver module according to an embodiment of the present invention. The optical transceiver module 202 includes a housing 204 and two optical transceiver devices 102. The housing 204 has a connector portion 206 disposed at an end thereof. The connector portion 206 includes two receptacles 208 formed thereon. The optical transceiver devices 102 are disposed in the housing 204, corresponding to the receptacles 208. Each one of the optical transceiver devices 102 includes a printed circuit board 104, an optoelectronic component 106 and a connecting interface 108. The printed circuit board 104 is disposed substantially perpendicular to a bottom surface 210 of the housing 204.

The optoelectronic component 106 has an intermediate block 118, an optical fiber interface 110, a reception portion 112 and a transmission portion 114. The optical fiber interface 110, the reception portion 112 and the transmission portion 114 are connected to the intermediate block 118. The optical fiber interface 110 can be connected to a fiber optic line to receive and transmit optical signals. The reception portion 112 and the transmission portion 114 are connected to the printed circuit board 104 to receive/transmit the electrical signals from/to the printed circuit board 104. The orientation of the optical fiber interface 110, the orientation of the reception portion 112 and the orientation of the transmission portion 114 are parallel to the printed circuit board 104.

In addition, the intermediate block 118 is preferably a cubical block and the height of the circuit board 104 is higher than the height of the intermediate block 118. In addition, the circuit boards 104 are paralleled with each other and disposed in the housing 204. The connecting interfaces 108 are preferably disposed on the outward sides of the circuit boards 104. Therefore, the distance of the pins 122 between the two circuit boards 104 is therefore increased. Hence, the optical transceiver module 202 can be more stably fixed on a socket or a circuit board.

Modern optical transceiver modules have been modularized with standard physical sizes, under standard electrical interface agreements and standard optical interface agreements. In accordance with an embodiment of the present invention disclosed herein, the housing 204 has substantially the same size as a GBIC optical transceiver module 202. The width of the connector portion 206 with two LC-type receptacles 208 is about 13.5 mm. Since the width of the optical transceiver device 102 is narrower than that of the conventional optical transceiver device, two optical transceiver devices 102 can be disposed in the housing 204, corresponding to the LC-type receptacles 208. The transceiver module with substantially the same size as a GBIC optical transceiver module 202 can hold two SFF single channel bi-direction optical transceiver modules 202. Thus, designers can put more than twice as many modules in the same area of the networking equipment and the density of the input and output ports can increase so as to reduce a total system cost thereof. Moreover, designers can replace conventional GBIC optical transceiver modules in networking equipment with the transceiver modules 202 of the present invention without having to greatly modify the layout of the networking equipment.

With continued reference to FIG. 2, the transceiver module also has a cover 212, a first retainer 214 and a second retainer 216 encircling the connector portion 206. The cover 212 is disposed on the housing 204. The optical transceiver devices 102 are located in the cavity formed by the housing 204 and the cover 212. The housing 204 includes latches 218 that snap into the latch apertures 220 of the first retainer 214 to fasten the optical transceiver devices 102. Therefore, the housing 204 and the first retainer 214 can further effectively position the optical fiber interface 110 of the optoelectronic component 106 of the optical transceiver devices 102.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An optical transceiver device, comprising:
   a printed circuit board having an L-shaped structure with a first segment and a second segment;
   an optoelectronic component, having an intermediate block, an optical fiber interface, a reception portion and a transmission portion, wherein the optical fiber interface, the reception portion and the transmission portion are connected to the intermediate block, and the reception portion and the transmission portion are further connected to the first segment and the second segment of the printed circuit board respectively, and wherein the orientation of the optical fiber interface, the orientation of the reception portion and the orientation of the transmission portion are parallel to the printed circuit board; and
   a connecting interface mounted on one side of the printed circuit board, wherein the height of the printed circuit board is higher than the height of the intermediate block.

2. The optical transceiver device as recited in claim 1, wherein the connecting interface has a plurality of L-shaped pins penetrating through the printed circuit board.

3. The optical transceiver device as recited in claim 2, wherein free ends of the L-shaped pins are arranged in parallelism.

4. The optical transceiver device as recited in claim 1, wherein the intermediate block is a cubical block.

5. An optical transceiver module, comprising:
   a housing, having a connector portion disposed at an end thereof, wherein the connector portion includes a plurality of receptacles formed thereon; and
   a plurality of optical transceiver devices, disposed in the housing, corresponding to the receptacles, wherein each one of the optical transceiver devices comprises:
   a printed circuit board disposed substantially perpendicular to a bottom surface of the housing;
   an optoelectronic component, having an intermediate block, an optical fiber interface, a reception portion and a transmission portion, wherein the optical fiber interface, the reception portion and the transmission portion are connected to the intermediate block, and the reception portion and the transmission portion are further connected to the printed circuit board, and wherein the orientation of the optical fiber interface, the orientation of the reception portion and the orientation of the transmission portion are parallel to the printed circuit board; and a connecting interface mounted on one side of the printed circuit board, wherein the height of the printed circuit board is higher than the height of the intermediate block, wherein the width of the connector portion is about 13.5 mm.

6. The optical transceiver module as recited in claim 5, wherein the receptacles are LC-type receptacles.

7. The optical transceiver module as recited in claim 5, wherein the printed circuit board has an L-shaped structure with a first segment and a second segment, and wherein the reception portion and the transmission portion are connected to the first segment and the second segment respectively.

8. The optical transceiver module as recited in claim 5, wherein the connecting interfaces have a plurality of L-shaped pins penetrating through the circuit board.

9. The optical transceiver module as recited in claim 8, wherein free ends of the L-shaped pins are arranged in parallelism.

10. The optical transceiver module as recited in claim 5, wherein the intermediate block is a cubical block.

11. The optical transceiver module as recited in claim 5, wherein the optical transceiver module further comprises a first retainer with latch apertures and the housing further comprises latches to snap into the latch apertures, and the first retainer and the housing position the optical fiber interfaces.

12. The optical transceiver module as recited in claim 11, wherein the first retainer is made of a plastic material.

13. An optical transceiver module, comprising:
a housing having a connector portion disposed at an end thereof, wherein the connector portion includes a plurality of LC-type receptacles formed thereon, and
two optical transceiver devices disposed in the housing, corresponding to the LC-type receptacles, wherein each one of the optical transceiver devices comprises:
a printed circuit board having an L-shaped structure with a first segment and a second segment, and disposed substantially perpendicular to a bottom surface of the housing;
an optoelectronic component, having an intermediate block, an optical fiber interface, a reception portion and a transmission portion, wherein the optical fiber interface, the reception portion and the transmission portion are connected to the intermediate block, and the reception portion and the transmission portion are connected to the first segment and the second segment of the printed circuit board, and wherein the orientation of the optical fiber interface, the orientation of the reception portion and the orientation of the transmission portion are parallel to the printed circuit board; and
a connecting interface mounted on an external side of the printed circuit board, wherein the height of the printed circuit board is higher than the height of the intermediate block;
wherein the printed circuit board has an L-shaped structure with a first segment and a second segment, and wherein the reception portion and the transmission portion are connected to the first segment and the second segment respectively.

14. The optical transceiver module as recited in claim 13, wherein the connecting interfaces have a plurality of L-shaped pins penetrating through the circuit board.

15. The optical transceiver module as recited in claim 13, wherein free ends of the L-shaped pins are arranged in parallelism.

16. The optical transceiver module as recited in claim 13, wherein the intermediate block is a cubical block.

17. The optical transceiver module as recited in claim 13, wherein the optical transceiver module further comprises a first retainer with latch apertures and the housing further comprises latches to snap into the latch apertures, and the first retainer and the housing position the optical fiber interfaces.

18. The optical transceiver module as recited in claim 17, wherein the first retainer is made of a plastic material.

* * * * *